Patented Nov. 16, 1948

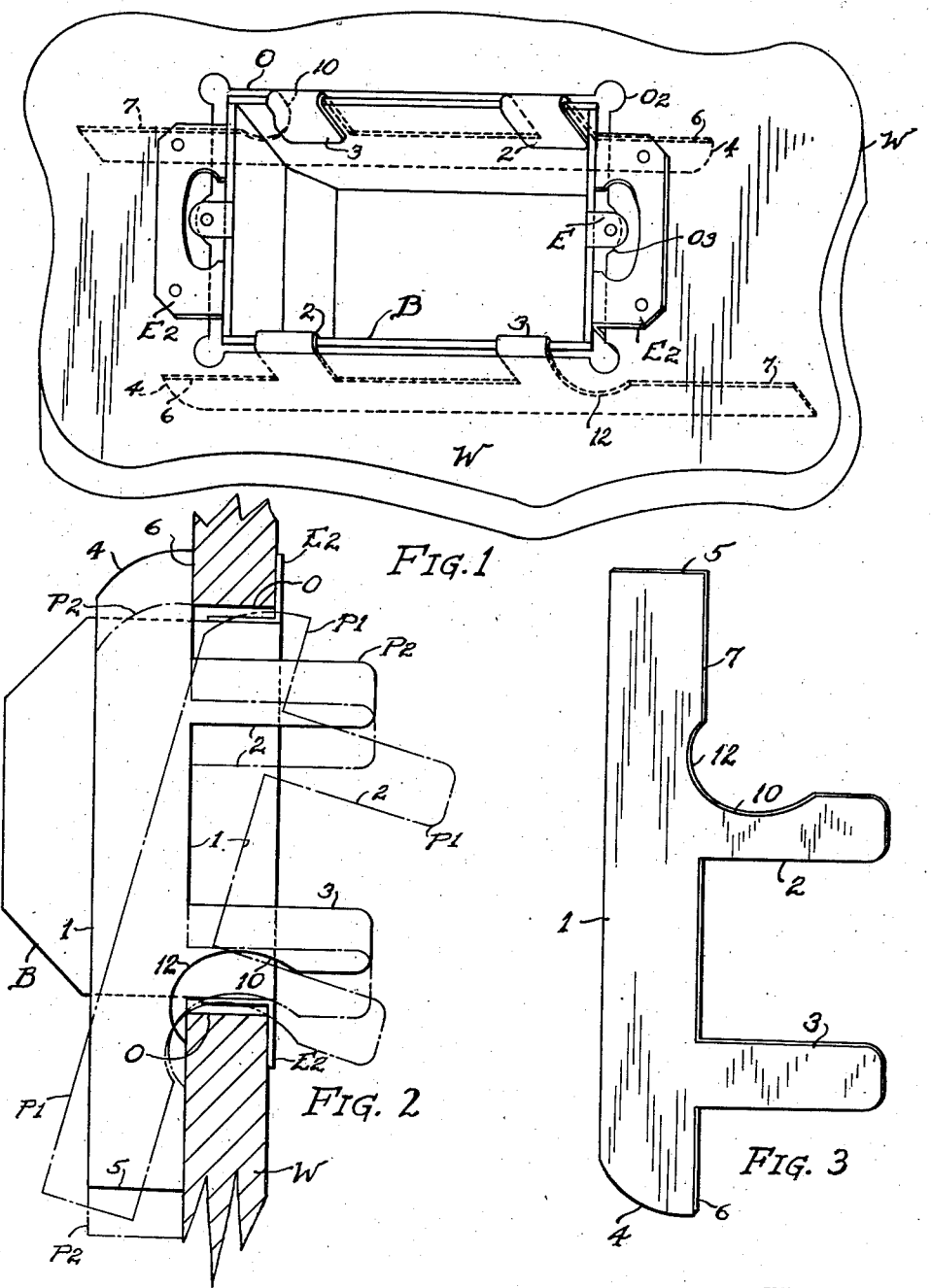

2,454,119

UNITED STATES PATENT OFFICE 2,454,119

SWITCH BOX SUPPORT

Earl B. Atkinson, Bay Village, Ohio

Application June 6, 1947, Serial No. 752,973

2 Claims. (Cl. 248—27)

This invention relates to devices for securing switch boxes into wall openings.

Its essential objects are to provide a device which shall very securely hold a switch box firmly and permanently in position and which may be simple to manufacture and very convenient to use and apply.

More specifically, switch boxes of rectangular form when placed loosely into a substantially rectangular opening, have their inward movement limited by projections or ears at the opposite ends engaging the face of the wall.

When so positioned and held, it is desired to effect a clamping means which shall engage the rear of the wall and which may extend outwardly over and into the open side of the switch box.

When assembling such clamping or holding means, difficulties are encountered in positioning the clamping means preparatory to inserting the switch box and variations in wall thickness must be compensated for.

In a prior patent, No. 1,820,309, was shown a flat metal fastening device in some respects similar to the present invention, but which required to first have its clamping fingers bent against the wall while the rear supports engaged the rear side of the wall, and then the box was inserted and the fingers bent inwardly over the edge of the box.

Underwriters' specifications require that the clamping fingers be spaced away from the "hot wire" fastenings and contacts, and be placed near the ends of the box. This position affords a limitation against inserting a straight flat metal securing piece after the box is in position. However, the present invention overcomes this latter difficulty and provides a simple one piece fastener, two of which may be quickly inserted when the box is in position, one at either side of the box, and which may be effectively clamped upon the box in the proper position, and which fully meets all of the requirements and serves to permanently and securely hold the switch box as desired.

A specific object is to so construct the securing device that it may be inserted without bending, by sliding and tipping it inwardly past the side of the box at the long side of the hole in the wall, into which the box is fitted.

A previous device, intended in some respects to be assembled and used in like manner, is disclosed in a prior patent, No. 1,816,584, which device, however, had definite limitations in practice as to its use for varying thicknesses of wall, and which required a wider strip and closer finger arrangement, which has met objections both as to the underwriters' requirements and inconvenience in use.

Other advantages and distinctions of my present invention will become apparent in the following specification which relates to the accompanying drawings, in which:

Fig. 1 is a perspective view showing my fastener applied to a switch box in the wall;

Fig. 2 is a side elevation of the box and a section of the adjacent wall showing the manner of inserting my fastening device; and Fig. 3 is an elevation slightly in perspective showing one of my fastening devices.

Referring to the drawings by use of reference characters, a wall W which may vary from a quarter of an inch or less to three quarters of an inch in thickness, and which may be of any construction, has the usual switch box opening O cut therein and of a shape to loosely receive the switch box. The corner notches $O^2$ affording convenience of cutting the opening, and end notches $O^3$ affording clearance for the cover clamping screws entering the threaded ears E at the opposite ends of the box B.

Likewise, on the ends of the box are the usual outwardly projecting ears $E^2$ lying against the face of the wall outside of the opening O.

When in this position, it is desired to bridge across the opening at the back of the wall and engage the forward edge of the box with side clamping members or holding devices. Such devices of the present invention are preferably of the shape shown particularly in Fig. 3.

The individual securing devices comprise essentially a flat metal bar member 1 having clamping fingers 2 and 3 extending in parallel relation from one side of the bar member and of sufficient length to project through the wall and reach over and be bent down into the box.

These devices may be made of any suitable ductile corrosion resistant metal.

At one end, the bar extends preferably something less than the length of one of the fingers to a curved or beveled edge 4, while at the other end it may extend to a straight edge 5 at as great or somewhat greater distance from the finger 2. For a widely used size of switch box a bar about five inches long and three quarters of an inch wide is used with the fingers spaced as shown.

If both the fingers 3 have parallel sides and are of the width and spacing required, it is not possible to insert this bar and fingers as a unit through the opening at the side of the box. However, without disturbing the spacing of the fingers 2, I am able to so arrange the device as to permit it to be easily passed through the wall opening and be then brought to holding position.

That is, both these fingers are of the desired width and are properly spaced apart the required distance to be free from the hot wire connections on a receptacle and switch parts. This spacing likewise permits locating the fingers evenly near the ends of the box, and thus in turn assure the projecting edge 6 bridging over and engaging a substantial distance above the rear wall opening as in Fig. 2.

To maintain this spacing and the desired width of the finger 3 and preferably of the outer end of the finger 2, I provide particularly shaped cut-away portions such as to leave the base of the finger 2 approximately its normal width at the line of juncture with the bar 7, while affording merging curves 10 and 12 forming, in effect, a single curved recess.

The effect of this recess is to shorten the distance between the extreme point of the curved end 4 and the finger 2 without disturbing the spacing and proportions described.

In the form shown, the effect of this notch is that the one end 5 of the fastener may be inserted through the opening O beside the box, and be projected downwardly until the surfaces 10 and 12 engage the edges of the opening through the wall, this being the position shown in dot and dash lines at P¹.

By grasping the finger 2, the device is slid through the opening while the box is in position, and firmly held by the ears E² against the wall. The bar is swung rearwardly to the position shown in P². Then the fingers 2 and 3 are properly positioned with relation to the ends of the box which lifts the bar bringing the edge 6 and its beveled end 4 behind the wall at the end of the opening while the lower edge 7 engages the wall at the opposite end of the opening.

When so positioned, the fingers 2 and 3 are then bent firmly inwardly over the edge of the box and against its inner sides while it is still held with its ears tightly against the wall.

Another bar fastener unit is then inserted with its long end at the opposite end of the hole beside the box and its curved end 4 is swung inwardly. The fingers positioning the bridging engagement at the back of the opening is again effected, and its fingers are bent inwardly over the edge of the box, as shown in Fig. 1.

It will be seen that the critical distance between the side of the finger 2, away from the beveled or curved edge 4 and this bevel is so determined that this swinging of the bar through the opening is permitted, while still providing a maximum extension beyond the finger 3 along the edge 6 to assure a substantial distance of engagement of this edge 6 against the rear surface of the wall.

It will be noted in Fig. 2 that the portion 12 cut away from the edge of the main bar, and the portion 10 effect a minimum of weakening of these parts while being so shaped as to slide around the edge corners of the opening in a wall, up to three quarters of an inch thick, which is the usual maximum.

Having thus described my invention, what I claim is:

1. A switch box securing device comprising a flat bar of stiff but somewhat ductile metal having a length several times that of its width, and having spaced securing fingers integral therewith and extending from one edge, and adapted to be bent over the edge of the box and have their ends engage the inside of the same, the bar extending each way from the spaced apart fingers a distance sufficient to provide substantial engagement with the back of a wall into which the switch box is fitted, and having a sloping surface at one end of the bar and a cutaway portion at the juncture between the remote finger and the adjacent edge of the bar to facilitate inserting the bar edgewise beside the box in its receiving opening.

2. A switch box fastening device such as described in claim 1 in which the cutaway portion is in the form of a curved notch extending along the side of the finger for a distance of approximately the maximum wall thickness.

EARL B. ATKINSON.

REFERENCES CITED

The following references are of record in the file of this patent:

UNITED STATES PATENTS

| Number | Name | Date |
| --- | --- | --- |
| 2,126,114 | Jett | Aug. 9, 1938 |
| 2,371,210 | Atkinson | Mar. 13, 1945 |